(12) United States Patent
Savant et al.

(10) Patent No.: US 8,851,536 B2
(45) Date of Patent: Oct. 7, 2014

(54) HANDLE FOR A DOOR LEAF OF A MOTOR VEHICLE

(75) Inventors: Fiorenzo Savant, Pianezza (IT); Alberto Gramaglia, Pianezza (IT)

(73) Assignee: VALEO S.p.A., Santena (TO) (IT)

( * ) Notice: Subject to any disclaimer, the term of this patent is extended or adjusted under 35 U.S.C. 154(b) by 257 days.

(21) Appl. No.: 13/393,545

(22) PCT Filed: Sep. 15, 2010

(86) PCT No.: PCT/EP2010/063533
§ 371 (c)(1),
(2), (4) Date: Jul. 18, 2012

(87) PCT Pub. No.: WO2011/032976
PCT Pub. Date: Mar. 24, 2011

(65) Prior Publication Data
US 2012/0274087 A1   Nov. 1, 2012

(30) Foreign Application Priority Data

Sep. 18, 2009   (IT) .............................. MI2009A1597

(51) Int. Cl.
| | |
|---|---|
| *E05B 3/00* | (2006.01) |
| *E05B 85/10* | (2014.01) |
| *B60R 13/00* | (2006.01) |
| *E05B 85/16* | (2014.01) |
| *G05G 1/06* | (2006.01) |
| *E05B 1/00* | (2006.01) |

(52) U.S. Cl.
CPC ............. *B60R 13/005* (2013.01); *E05B 1/0084* (2013.01); *E05B 85/10* (2013.01); *E05B 85/16* (2013.01)
USPC ............. 292/336.3; 16/86 A; 16/412; 16/441; 296/1.02; 296/71

(58) Field of Classification Search
CPC ................................. E05B 85/10; E05B 85/16
USPC ........ 292/336.3; 16/86 A, 412, 441; 296/1.02, 296/71
See application file for complete search history.

(56) References Cited

U.S. PATENT DOCUMENTS

| | | | | | |
|---|---|---|---|---|---|
| 329,321 | A | * | 10/1885 | Leger | ............................. 292/347 |
| 1,263,880 | A | * | 4/1918 | Glossop | ........................ 292/347 |

(Continued)

FOREIGN PATENT DOCUMENTS

DE      10 2004 062918 A1     7/2006

OTHER PUBLICATIONS

International Search Report w/translation from PCT/EP2010/063533 dated Nov. 4, 2010 (4 pages).

*Primary Examiner* — Carlos Lugo
(74) *Attorney, Agent, or Firm* — Osha Liang LLP

(57) ABSTRACT

A handle for a door leaf of a motor vehicle, including a stationary portion mounted on the outer panel of the door leaf, and a gripping lever pivotably mounted relative to the stationary portion and configured to be operated by a user. The gripping lever includes: a pivotably movable outer shell having a front surface visible to a user and a rear surface opposite the front surface, and a recess provided in the outer shell, which forms an opening in the visible front surface of the outer shell, and a decorative insert attached inside the recess and having a front wall that is substantially flush with the front surface of the outer shell, a rear wall attached to the rear surface of the outer shell, and at least one rib connecting the front and rear walls of the decorative insert, the front and rear walls and the rib being made of one piece.

10 Claims, 1 Drawing Sheet

(56) References Cited

U.S. PATENT DOCUMENTS

| | | | |
|---|---|---|---|
| 1,496,435 A * | 6/1924 | Soreng | 292/347 |
| 1,762,447 A * | 6/1930 | Lowes | 250/465.1 |
| 2,007,476 A * | 7/1935 | Miller | 292/347 |
| 2,007,555 A * | 7/1935 | Wiltshire, Jr. | 40/331 |
| 2,125,783 A * | 8/1938 | Heeman | 292/347 |
| D112,807 S * | 1/1939 | Cossin | D8/308 |
| 3,313,057 A * | 4/1967 | Leddy | 40/331 |
| 4,087,141 A * | 5/1978 | Roberts | 312/348.6 |
| 4,165,659 A * | 8/1979 | Fawley | 74/558 |
| 4,862,642 A | 9/1989 | Alessi | |
| 6,242,064 B1 * | 6/2001 | Howie, Jr. | 428/35.7 |
| 6,463,630 B1 * | 10/2002 | Howie, Jr. | 16/441 |
| 6,826,804 B2 * | 12/2004 | Zaidman | 16/436 |
| 7,201,415 B2 * | 4/2007 | Elwell | 296/1.08 |
| 7,455,437 B2 * | 11/2008 | Shi | 362/501 |
| 2003/0033690 A1 * | 2/2003 | Lin | 16/412 |
| 2006/0125262 A1 | 6/2006 | Elwell | |
| 2006/0282987 A1 | 12/2006 | Shih et al. | |
| 2007/0158960 A1 | 7/2007 | Tanimoto et al. | |
| 2011/0012378 A1 * | 1/2011 | Ueno et al. | 292/336.3 |

* cited by examiner

HANDLE FOR A DOOR LEAF OF A MOTOR VEHICLE

The invention relates to a handle for an opening element of a motor vehicle and more particularly an outer handle.

In general, such a handle is mounted on the outer panel of the opening element and comprises a fixed portion mounted behind the outer panel and a gripping lever that can move relative to the fixed portion. This gripping lever can be accessed from the outside of the vehicle and is designed to be actuated by a user in order to open the vehicle.

Such a gripping lever may therefore be manipulated by the user several times a day and must consequently have good mechanical strength.

Moreover, in the motor-vehicle field, it is necessary to satisfy an increasing demand for personalization of the vehicle, of the passenger compartment of the vehicle on the bodywork notably of the outer handles, while retaining a standardization in order to control production cost.

A known solution consists in fixing a decorative strip on the visible side of the handle and in particular on the gripping lever. This decorative strip is for example made of stainless steel, of anodized aluminum, or else chrome-plated alloy.

However, the fixing of such a decorative strip is not long-lasting.

Specifically, the decorative strip fixed to the gripping lever can be detached from the handle due to the manipulation of the handle by the user or else accidentally during the cleaning of the vehicle in a car wash or by a high-pressure water jet.

The objective of the invention is therefore to propose such a handle having decorative elements, such handle making it possible to alleviate this drawback of the prior art while providing a good mechanical strength of the handle.

Accordingly, the subject of the invention is a handle for a motor vehicle opening element comprising a fixed portion mounted on the outer panel of said opening element, and a gripping lever mounted so as to pivot relative to the fixed portion and configured in order to be actuated by a user, characterized in that the gripping lever comprises:

an outer shell that can move pivotingly having:
 a front face that can be seen by a user and a rear face opposite to the front face, and
 a recess arranged in said outer shell forming an opening in the visible front face of said outer shell,
a decorative insert fixed in the recess and having a front wall substantially flush with the front face of said outer shell, a rear wall fixed to the rear face of said outer shell, and at least one rib linking said front wall and rear wall of the decorative insert, said front wall and rear wall and said rib being made in one piece.

The outer shell and decorative insert assembly thus assembled make it possible to form a rigid structure of the gripping lever conferring good mechanical strength on the handle and great reliability, while making it possible to display decorative elements on the decorative insert that do not risk becoming accidentally detached from the handle.

Said handle may also comprise one or more of the following features, taken separately or in combination:

said handle comprises a bolt cover plate held by the fixed portion and comprising a fixed outer shell having a front face that can be seen by a user, a rear face opposite to the front face and a recess arranged in said outer shell forming an opening in the visible front face of said outer shell, and a decorative insert fixed in the recess and having a front wall substantially flush with the front face of said outer shell, a rear wall fixed to the rear face of said outer shell, and at least one rib linking said front and rear walls of the decorative insert, said front and rear walls and said rib being made in one piece, the recess is a through-recess and the rear wall of the decorative insert is substantially flush with the rear face of said outer shell; this gives both a solid fixing of the decorative insert in the outer shell and an agreeable feel for the user at the rear of the gripping lever when he takes hold of the gripping lever, the recess is arranged substantially in the center of said outer shell, said handle comprises a clipping means supported on the one hand by said outer shell and on the other hand by the decorative insert in order to secure said outer shell and the decorative insert; the outer shell and the decorative insert are then secured simply and reliably, said handle comprises an additional means for fixing said outer shell and the decorative insert, such as a fixing means by bonding or by screwing; this additional fixing makes it possible to increase the reliability and the mechanical strength of the gripping lever, the decorative insert is configured to be made in a material that is different than said outer shell, for example a material suitable for a desired finish such as a chrome coating, the front wall of the decorative insert is configured to receive a finishing treatment, which makes it possible for example to display a sturdy and refined aspect, said finishing treatment is chosen from chrome-plating, graining or painting, the front wall of the decorative insert has a reduced size relative to the rear wall in order for the decorative insert to be mounted in said outer shell from the rear; the outer shell and the decorative insert are therefore fixed at the rear of the gripping lever so that an excessively powerful water jet, in contact with the front face of the gripping lever cannot dislodge the decorative insert, said handle comprises electronic components supported by the decorative insert and housed between the front wall and rear wall of the decorative insert; specifically, the decorative insert according to at least one of the foregoing features is incorporated into the outer shell and reliably fixed without preventing the installation in the gripping lever of electronic components which increase ease of use for the user.

Other features and advantages of the invention will emerge from the following description, given as an example, without being limiting, with respect to the appended drawings amongst which:

In these figures, identical elements bear the same reference numbers.

FIG. 1 shows a front view of an outer handle 1 of an opening element of a motor vehicle (not shown) such as a side door.

The handle 1 comprises a gripping lever 3 mounted on the outer panel of the opening element and therefore accessible from the outside of the vehicle and on which a user can pull outward to open the opening element.

This lever 3 is linked to a fixed portion (not shown), also called the handle base or support, which is designed to be mounted on the inside of the opening element, more precisely between the outer panel and the inner panel of the opening element; this fixed portion is therefore not visible once installed on the vehicle.

The handle 1 shown here is a handle of the "fridge" type and the gripping lever 3 can be rotated relative to the fixed portion of the handle and can pivot between a rest position and a position for controlling the opening of a lock of the opening element, when the user pulls on this gripping lever 3.

Moreover, the gripping lever 3 comprises an outer shell 5 and a decorative insert 7 incorporated into the outer shell 5 and fixed to the outer shell 5.

More precisely, the outer shell 5 can be moved pivotingly in order to allow the user to pivot the gripping lever 3 as specified above.

Figure 2:
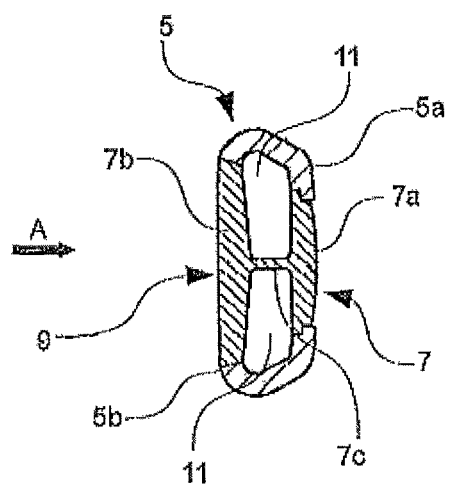
FIG. 2 is a view in cross section of the handle along the axis I-I of FIG. 1.

With reference also to FIG. 2, it can be seen that the outer shell 5 has a front face 5a that can be seen by the user and a rear face 5b opposite to the front face 5a.

This outer shell 5 has a recess 9 which forms an opening in the front face 5a of the outer shell 5.

The recess 9 may be a through-recess as illustrated in FIG. 2, in which case it also forms an opening in the rear face 5b of the outer shell 5.

Figure 1:
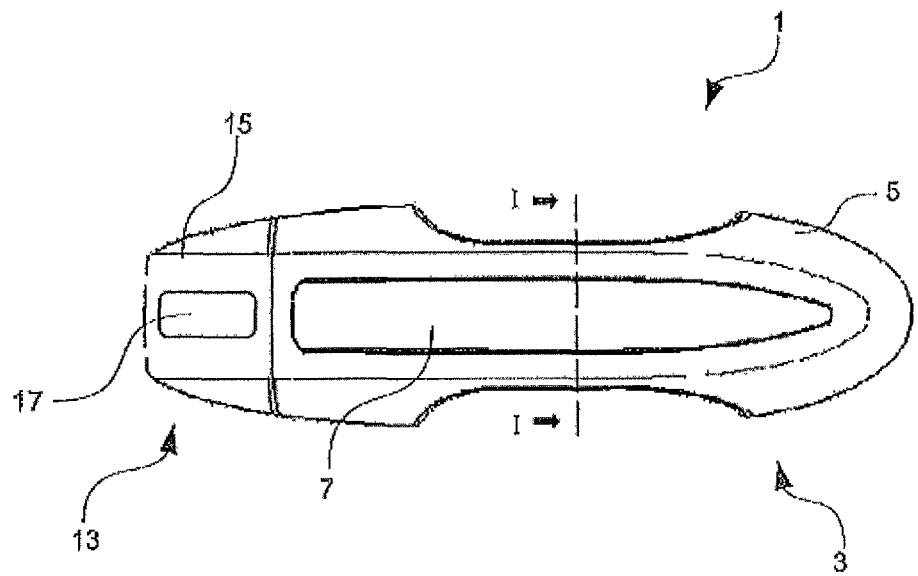
FIG. 1 is a front view of a handle according to the invention.

According to the embodiment represented in FIG. 1, the recess 9 is arranged substantially in the center of the outer shell 5.

The decorative insert 7 comprises a front wall 7a, a rear wall 7b and a rib 7c linking the front wall 7a and rear wall 7b. Several ribs 7c could be provided between the front wall 7a and rear wall 7b to further reinforce the mechanical strength.

The front wall 7a, the rear wall 7b and the rib 7c are formed in a single piece.

In the example illustrated, the insert 7 has a generally H-shaped cross section, the side branches being formed by the front wall 7a and rear wall 7b, and the cross branch by the rib 7c.

This insert 7 is mounted in the recess 9. According to the embodiment described, the recess 9 is a through-recess and the decorative insert 7 is mounted from the rear as shown by the arrow A. For this, the front wall 7a has a reduced size relative to the rear wall 7b.

The decorative insert 7 is therefore inserted into the outer shell 5 via the orifice of the recess 9 formed on the rear face 5b of the outer shell 5 until the front wall 7a of the decorative insert 7 is substantially flush with the front face 5a of the outer shell 5. In the example illustrated, the rear wall 7b is also flush with the rear face 5b of the outer shell 5. The ends of the front wall 7a are linked by the outer shell 5 to the ends of the rear wall 7b situated substantially opposite so that the gripping lever 3 has a cross section with an overall shape that is substantially like an "8".

The front wall 7a is therefore visible from the outside of the vehicle.

It is therefore on this front wall 7a of the decorative insert 7 that a decoration is provided, such as a logo, a decorative symbol or any graphic representation or else a different finish relative to the outer shell 5.

In the latter case, the decorative insert 7 can be made in a different material than the outer shell 5, this material making it possible to carry out the desired finishing treatment. It is possible to provide, for example, painting, chrome-plating or else graining for the finishing of the front wall 7a of the decorative insert 7.

As an example, the outer shell 5 can therefore be painted or else grained, while the front wall 7a of the decorative insert 7 has a chrome plating. Any other variant in which a particular finish or a decorative element is displayed on the front wall 7a of the decorative insert 7 can be envisaged.

Moreover, the insert 7 is held in the outer shell 5 by a fixing of the rear wall 7b to the rear face 5b of the outer shell 5, for example by clipping. In this case, it is possible to provide that the rear wall 7b of the decorative insert 7 supports first clipping ribs which interact with second matching clipping ribs supported by the rear face 5b of the outer shell 5. Naturally any other fixing means may be provided.

In order to reinforce the fixing between the outer shell 5 and the decorative insert 7, it is possible to provide an additional fixing means. As an example, it is possible to interpose adhesive between the rear face 5b of the outer shell 5 and the rear wall 7b of the decorative insert 7, or else to screw the rear face 5b and the rear wall 7b together.

The insert 7 therefore forms part of the structure of the gripping lever 3 and may support electronic components of the handle 1. It is possible to cite as an example a microswitch, presence or proximity sensors, or else a light source for lighting up the handle and/or the ground in front of the vehicle. These electronic components are then housed in the orifices 11 between the front wall 7a and rear wall 7b of the decorative insert 7.

Moreover, referring again to FIG. 1, the handle 1 may have a bolt cover plate 13 supported by the fixed portion of the handle. This bolt cover plate 13 is therefore fixed and may comprise a housing for a bolt designed to prevent the actuation of the lock.

This bolt cover plate 13 may also comprise an outer shell 15 and a decorative insert 17 similar to the outer shell 5 and the decorative insert 7 of the gripping lever 3.

The handle 1 thus formed makes it possible to display decorative elements on the front wall of the decorative insert 7, 17 incorporated reliably into the outer shell 5, 15 while having reinforced mechanical strength.

It is thus possible to easily design various versions of handles in the finishes or decorations for example according to the model or category of the vehicle.

Moreover, the quantity of tools for producing the various versions of finish for the handles is reduced, which reduces the production cost of the handle.

The invention claimed is:

1. A handle for a motor vehicle opening element comprising:
    a fixed portion mounted on the outer panel of said opening element; and
    a gripping lever mounted so as to pivot relative to the fixed portion and configured to be actuated by a user,
    wherein the gripping lever comprises:
        an outer shell that pivots, comprising a front face that can be seen by a user and a rear face opposite to the front face, and a recess arranged in said outer shell forming an opening in the visible front face of said outer shell,
        a decorative insert fixed in the recess and comprising a front wall substantially flush with the front face of said outer shell,
        a rear wall fixed to the rear face of said outer shell, and
        at least one rib linking said front wall and rear wall of the decorative insert, wherein the front wall, the rear wall, and the rib are made in one piece, and
    further comprising a bolt cover plate held by the fixed portion and comprising:
        a fixed outer shell having a front face that can be seen by a user and a rear face opposite to the front face, and a recess arranged in said outer shell forming an opening in the visible front face of said outer shell,
        a decorative insert fixed in the recess and having a front wall substantially flush with the front face of said outer shell, a rear wall fixed to the rear face of said outer shell, and at least one rib linking said front and rear walls of the decorative insert, wherein said front and rear walls and said rib are made in one piece.

2. The handle as claimed in claim 1, wherein said recess is a through-recess and the rear wall of the decorative insert is substantially flush with the rear face of said outer shell.

3. The handle as claimed in claim 1, wherein the recess is arranged substantially in the center of said outer shell.

4. The handle as claimed in claim 1, further comprising clipping means supported on one hand by said outer shell and on another hand by the decorative insert to secure said outer shell and the decorative insert.

5. The handle as claimed in claim 4, further comprising an additional means for fixing said outer shell and the decorative insert.

6. The handle as claimed in claim 1, wherein the decorative insert is made in a material that is different than said outer shell.

7. The handle as claimed in claim 1, wherein the front wall of the decorative insert has a finishing treatment.

8. The handle as claimed in claim 7, wherein said finishing treatment is one selected from a group consisting of chrome-plating, graining, or painting.

9. The handle as claimed in claim 1, wherein the front wall of the decorative insert has a reduced size relative to the rear wall, for the decorative insert to be mounted in said outer shell from the rear.

10. The handle as claimed claim 1, further comprising electronic components supported by the decorative insert and housed between the front wall and the rear wall of the decorative insert.

* * * * *